(No Model.) 4 Sheets—Sheet 2.

H. HARRISON.
RECORDING SCALE.

No. 360,220. Patented Mar. 29, 1887.

Witnesses:
Albert N. Adams.
Harry T. Jones.

Inventor:
Henry Harrison (No Model.) 4 Sheets—Sheet 3.
H. HARRISON.
RECORDING SCALE.
No. 360,220. Patented Mar. 29, 1887.
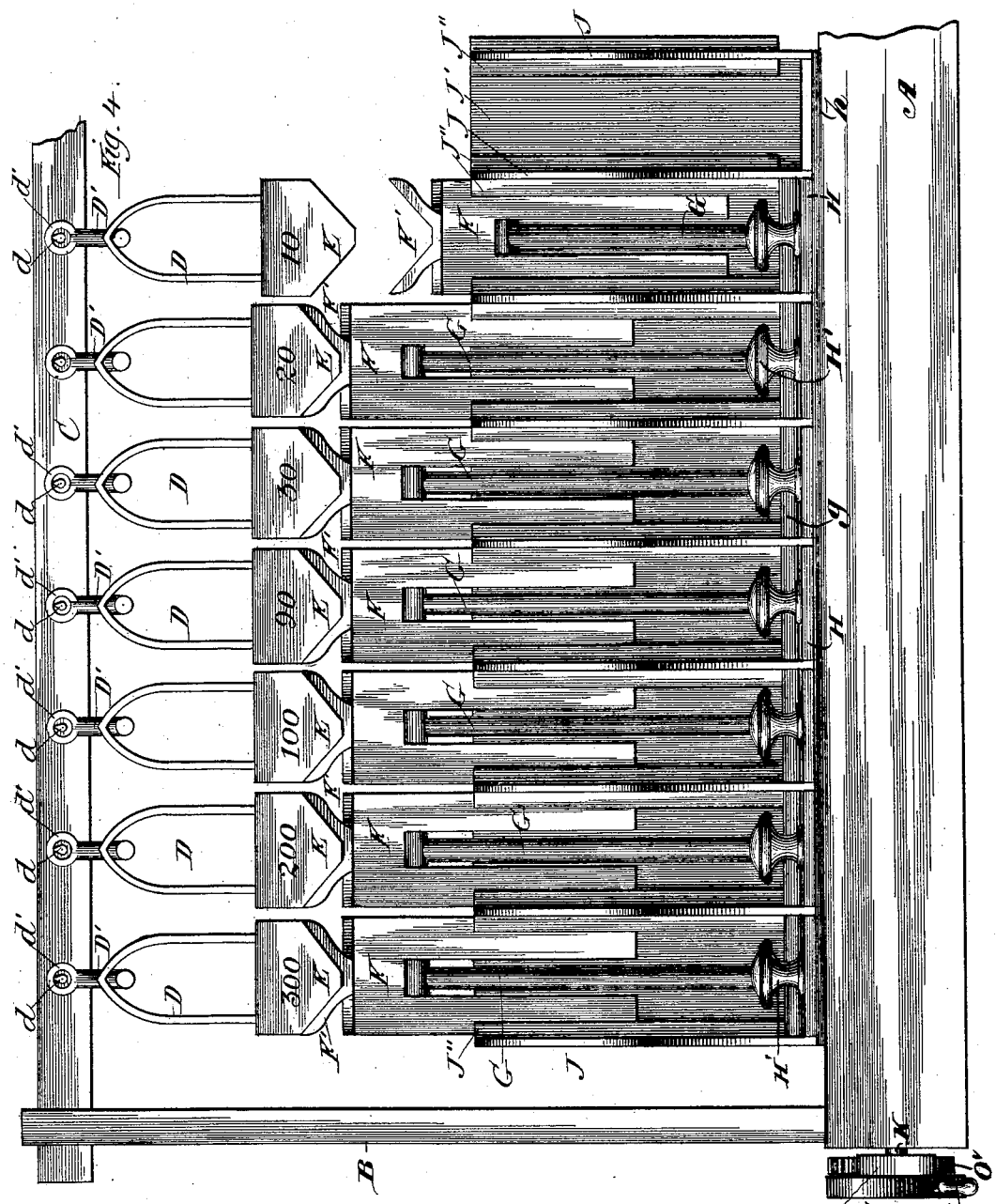
Witnesses:
Albert N. Adams
Harry T. Jones
Inventor:
Henry Harrison (No Model.) 4 Sheets—Sheet 4.
H. HARRISON.
RECORDING SCALE.
No. 360,220. Patented Mar. 29, 1887.
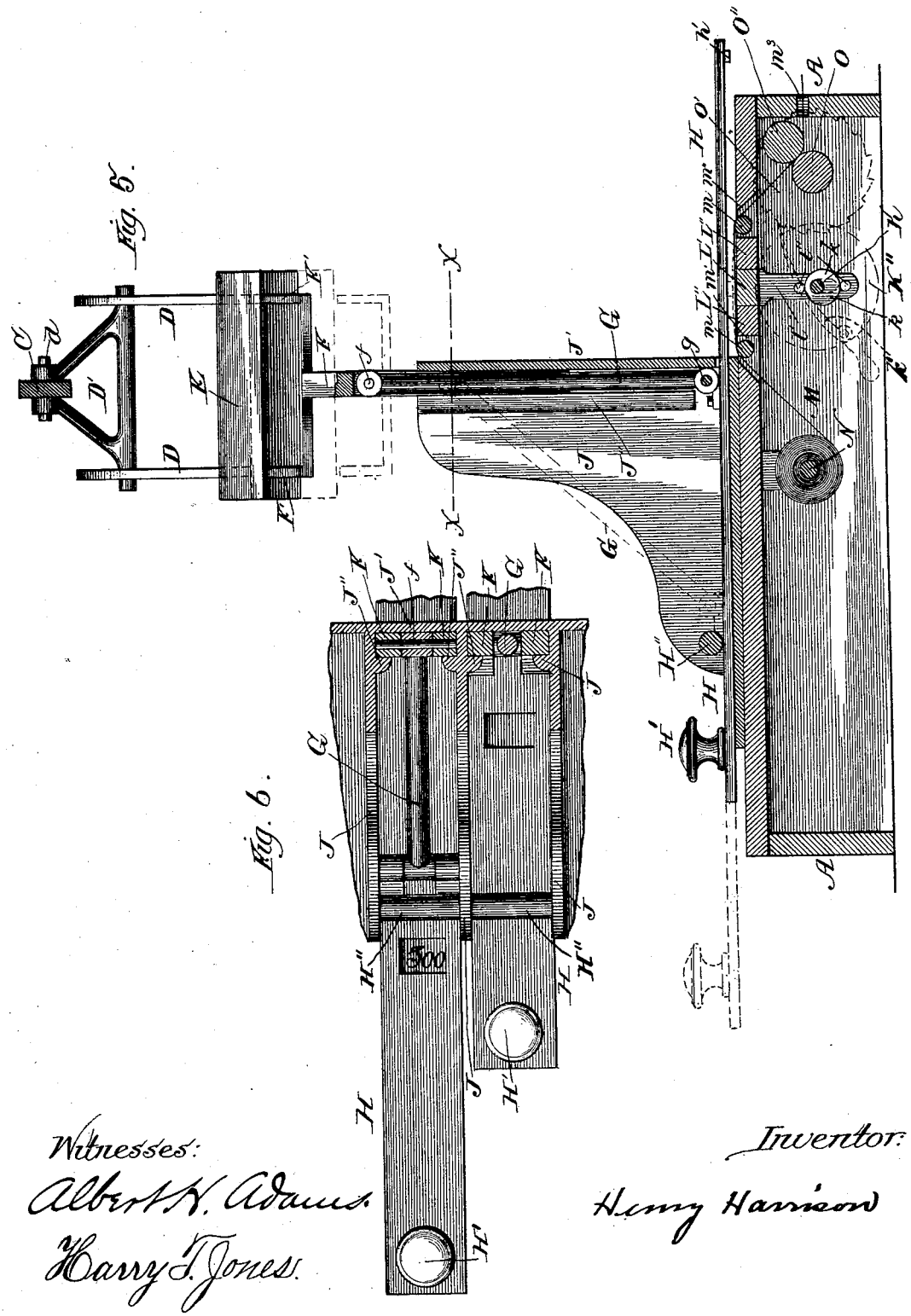
Witnesses:
Albert H. Adams.
Harry T. Jones.
Inventor:
Henry Harrison

United States Patent Office.

HENRY HARRISON, OF CHICAGO, ILLINOIS.

RECORDING-SCALE.

SPECIFICATION forming part of Letters Patent No. 360,220, dated March 29, 1887.

Application filed May 22, 1886. Serial No. 202,992. (No model.)

*To all whom it may concern:*

Be it known that I, HENRY HARRISON, residing at Chicago, in the county of Cook and State of Illinois, and a citizen of the United States, have invented a new and useful Improvement in Recording-Scales, of which the following is a full description, reference being had to the accompanying drawings, in which—

Figure 1:
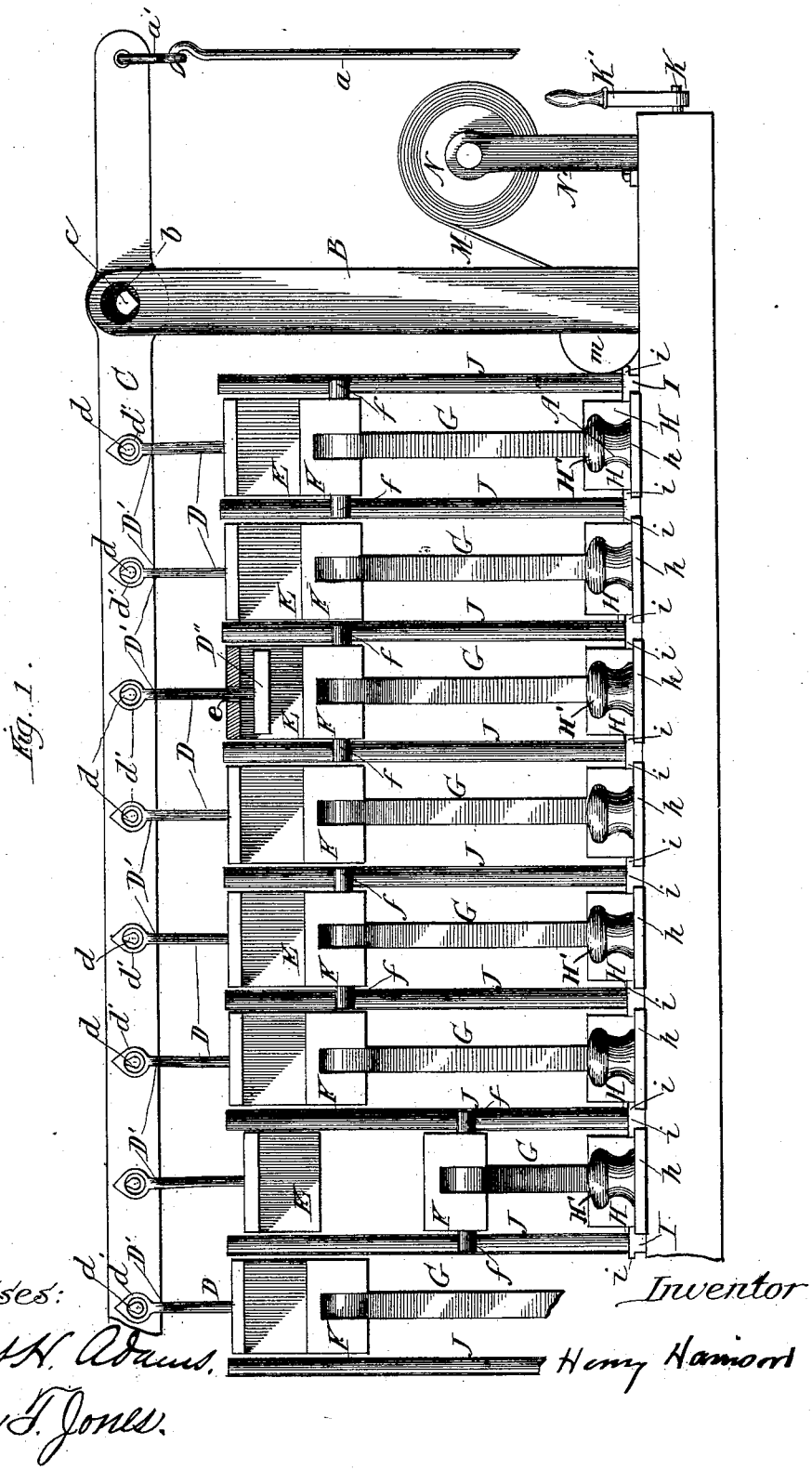
Figure 2:
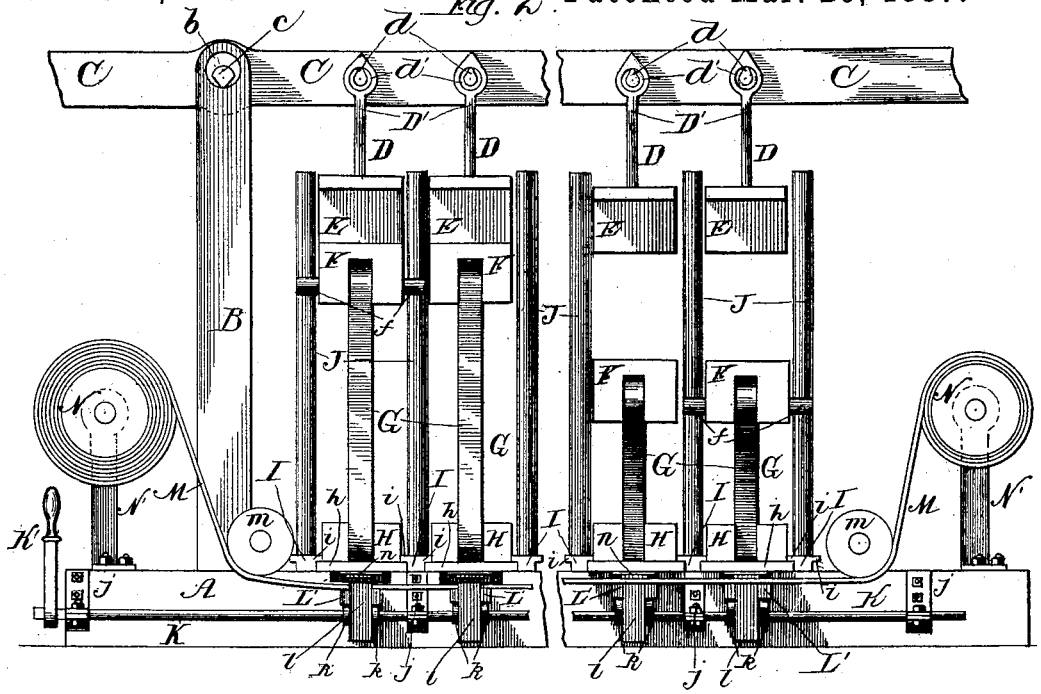
Figure 3:
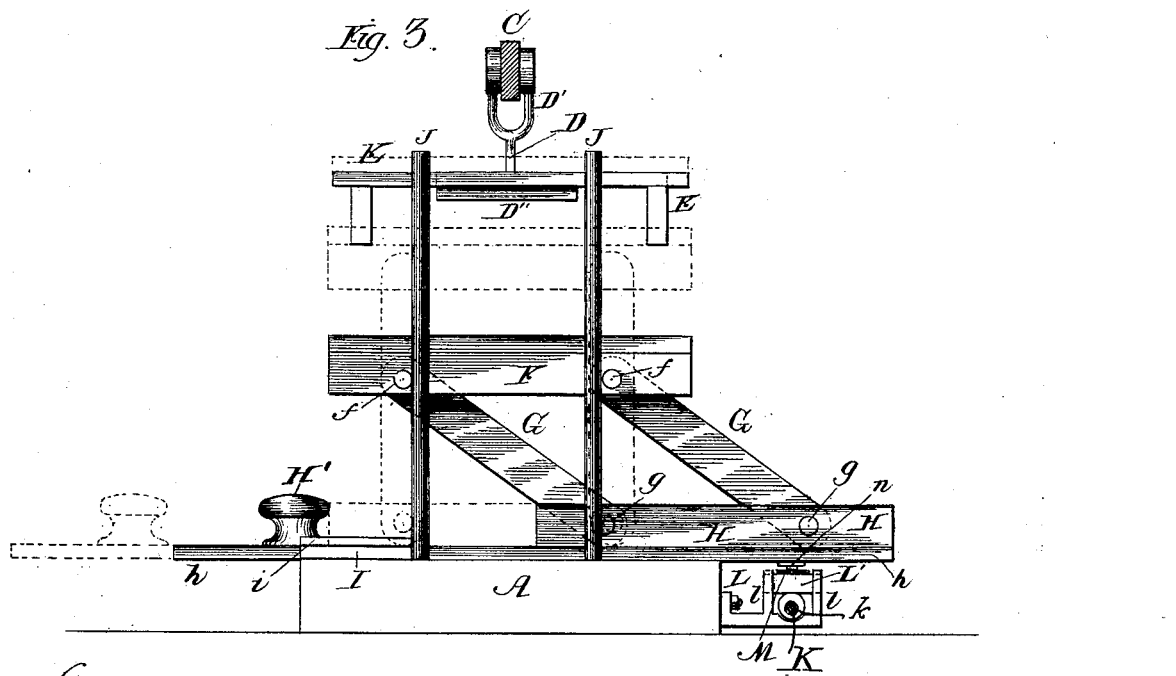

Figure 1 is a side elevation with one end broken off; Fig. 2, a side elevation broken away, showing the reverse side from that of Fig. 1; Fig. 3, a cross-section; Fig. 4, a side elevation with one end broken off, showing a modification in the construction of the support and in the hanging of the weights; Fig. 5, a cross-section of the arrangement shown in Fig. 4; Fig. 6, a section on line $x$ $x$ of Fig. 5, looking down.

This invention has for its objects to construct an attachment to be used with platform and other scales for the purpose of quickly and accurately obtaining the weight and producing a correct record of the weight indicated by the beam; and its nature consists in the several parts and combinations of parts hereinafter described, and pointed out in the claims as new.

In the drawings, A represents a base or support, formed of side and end pieces and a top, as shown, or in any other suitable manner to furnish a support for the other devices.

B represents a standard, the lower end of which is secured to the base or support, and the upper end is slotted to receive the scale-beam.

C represents the scale-beam, of a length to accommodate the weights for the capacity of the scale. This beam, at or near its rear end, is provided with pivots $c$, one on each side, which enter holes $b$ formed in the fork of the standard B, and furnish the fulcrums or bearings on which the scale-beam vibrates, and, as shown, at the rear end of the scale-beam is a link or hook, $a'$, which receives a rod, $a$, for connection with the platform in any usual and well-known manner.

D represents rods or links, each having, as shown in Figs. 1, 2, and 3, a fork, D', to straddle the scale-beam, and each arm of each fork is provided with a hole, $d'$, to receive a pivot, $d$, projecting out from the scale-beam, and, as shown in Fig. 1, each rod D at its free end has an enlarged portion or block, D'', which forms a support for the weight. As shown in Figs. 4, 5, and 6, the attaching device for the weight, instead of being a single rod with a fork, is formed of two loops or stirrup-shaped pieces, D, attached directly to the weight, and having their upper ends passed over the ends of a cross-bar from which extend up diagonal bars D', with ends between which the scale-beam enters, the projections or pivots $d$ on the scale-beam entering holes corresponding to $d'$ in the ends of the diagonal bars.

E represents the weights, arranged in a continuous series side by side, extending the full length of the scale-beam, and each formed, as shown in Figs. 1, 2, and 3, of a top plate and end pieces, the top plate having a hole, $e$, for the passage of the stem or rod D, so that the rod can move freely up and down when the weight is at rest. As shown in Figs. 4 and 5, the weight is made solid and its lower face is beveled off on each side.

F represents the supports for the weight. As shown in Figs. 1, 2, and 3, these supports are formed of a block or head and are located to have one in line with and beneath each weight. As shown in Figs. 4, 5, and 6, the support F is in the form of a sliding plate, on the upper end of which is a flange, at each end of which is a fork, F', corresponding in shape to the shape of the under side of the weight E, so that the fork will receive the weight when at rest, and by making the sides of the weight beveled and the fork of a corresponding shape the fork can be made to engage the weight and give it a true vertical hang, and at the same time bring it to a perfect state of rest in a vertical line in case the weight has a swinging or vibrating movement.

G represents connecting-links, two being used for each head or support F, as shown in Figs. 1, 2, and 3, the upper end of each link being pivotally connected with the head, and, as shown in Figs. 1, 2, and 3, the pins or pivots of each alternate head are made to project beyond the face of the head and form guides for giving the head a direct vertical movement.

H represents slides or heads, one for each head or support F, and connected with the head or support by the links G, the lower ends of which are pivotally connected with the slide or head H by pins or pivots $g$, and, as shown in Figs. 1, 2, and 3, each slide or head H is mounted on a plate, $h$, the sides of which project beyond the sides of the slide, so as to form flanges for maintaining a direct line of movement.

I represents blocks attached to the base or support A, and having on each side a flange, $i$, between which and the top of the base or support A the plate $h$ is located, so that the flange $i$ and base-plate $h$ furnish an attachment for the slides or heads H, by which they are free to move in and out, and, as shown, each plate $h$ is provided with a knob, H', by which the slide or head can be operated.

J represents guide-rods extending up from the blocks I, two rods, as shown, being provided for each block, and these rods J and blocks I are so located and arranged in relation to the supports or heads F as that the rods form a division between the heads or blocks F, and where the pins $f$ project form a guide for the pins in moving up and down. As shown in Figs. 4, 5, and 6, the division between the supports F is made by plates instead of rods, the plates J being connected one to another by a cross-plate, J', and each plate J having on each side a rib, J'', between which ribs and the cross-plate J' is a groove or channel to receive the edge of the plate or support F, as shown in Figs. 5 and 6, so that the support or plate F has free vertical play, and, as shown, in this construction a single rod or link, G, is used, the upper end of the rod having a head which enters a slot in the support or plate F and is held in place by a pin, $f$, and the lower end of the rod or link having a head which enters between ears on the plate or head H and is held in place by a pin or pivot, $g$.

K represents a cross shaft or rod supported in suitable bearings, $j$, on the side piece of the base A, and this rod at one end, as shown in Figs. 1 and 2, is provided with an arm or lever, K', by which the rod can be rocked or turned.

L represents brackets attached to the base A, each bracket having arms or ears $l$, between which is located a block, L', and beneath each block L' are arranged cam-disks $k$, which disks are firmly secured to the rod or shaft K, so that by rocking or turning the rod or shaft the cam-disks $k$ will act to raise and lower the blocks L'. A bracket, L, carrying a block, L', is provided for each slide or head H, so that when the slide or head is projected, as shown in Fig. 3, the bottom face thereof will lie over the block L', which coacts with the slide.

M represents a strip of paper running over the blocks L' and between the blocks and numeral types $n$, attached to the under face of the slide or block H, as shown in Figs. 2 and 3, which numeral types correspond to the weight indicated on the scale-beam by the weight with which the slide or block H coacts.

N represents reels, one at each end of the base or support A, and onto which the paper M is wound and unwound, the reels being supported in suitable arms or posts, N', extending up from the base or support. This construction is shown in Figs. 1 and 2. One of these reels N may be provided with a handle, (not shown,) by which the reel can be turned to advance the paper strip. As shown in Fig. 5, the paper passes from a shaft or reel N suspended from the under side of the top of the support A, out through an opening, $m'$, over a roller, $m$, thence across over the impression-block L', to and over a second roller $m$, through a hole, $m''$, thence between feed-rollers O O'', and out through a slot, $m^3$, by which the device is fed forward and held taut, and, as shown in Figs. 1 and 2, the paper is held taut by passing under rollers $m$ at each end and forward of the spools.

The impression-block L', instead of being one for each sliding head, may be in the form of a continuous piece, as shown in Fig. 5, being located between guide-strips L'', and, as shown, this block is raised in the construction shown in Fig. 5 by having depending arms $l'$, having pins $l''$, between which the cam-disks $k$ on the rock-shaft K are located, so that by rocking or turning the shaft the cam-disks will act on the pins and raise and lower the impression-block, and instead of an arm or lever, K', the rock-shaft K is provided with a disk, K'', having a handle, K', on which disk is a spring-ratchet, $k'$, the free end of which engages with the teeth of a ratchet-wheel, O', on the feed-roller O, between which roller and the roller O'' the paper M passes, so that with each rock or turn of the wheel to raise and lower the impression-block the ratchet-wheel O' will be advanced, turning the feed-roller O and advancing the sheet of paper M.

The slides or plates H can be limited in their movement by a stop, H'', located between the division-plates J, or a stop, $h'$, on the end of the plate, and, if desired, the top face of the slide can have numerals thereon indicating the weight for the poise E, with which the slide coacts in connection with the lifting block or support F. The attachment is designed to be used with any of the ordinary forms of platform and other scales, and such scales are, therefore, neither shown nor described.

The operation is as follows: The article to be weighed is placed on the platform of the scale, as usual, and the operator, by moving the slide H in the direction to withdraw the support F through the rod or link G from beneath the poise, allows such poise to drop and be suspended from the beam, indicating the number of pounds for the suspended poise, and by suspending the required number of poises by withdrawing the supports therefrom through the slides H the correct weight of the article on the platform can be ascertained, and when the desired number of poises for the weight have been suspended the slides H therefor will be projected over the impression block or blocks L', so that by rocking or turning the shaft K the impression block or blocks will be raised, bringing the paper M into contact with the numeral type on the under face of the projected slides and producing on the paper the numerals indicating the weight. For instance, if the article to be weighed had a weight of three hundred and thirty-six pounds, the operator would suspend the poise for three hundred pounds by withdrawing the support F, and the poise for thirty pounds by withdrawing its support, and the poise for six pounds by withdrawing its support, and by so suspending these poises the slides for withdrawing the supports of these poises would be projected and lie over the impression block or blocks, and the turning of the shaft K would produce an imprint on the paper M of 300, 30, and 6, indicating the weight to be three hundred and thirty-six pounds, and by moving the paper as the weight is recorded a space is provided for the next record, and so on, thus enabling the operator to keep an exact record of all weights without the trouble of recording them in a book or a slip kept for the purpose, and at the same time the record will be a correct one, as only the indicating-numerals of the projected slides will be transferred to the paper, the type of the other slides being clear of the paper, and as these numerals correspond with the numerals of the indicating-poise there will be no mistake in transferring the record to the paper, as is liable to be the case when the record is kept in a book or on a slip.

The weights or poises are arranged on the beam at a point for each poise or weight to correspond with the weight in pounds, and when the weights are raised by the action of the lifters or supports F the beam rides perfectly clear of these weights, and where part of the weights are suspended and part elevated the elevated ones do not interfere with the action of the beam, as they are clear therefrom, the suspending rods or loops D having a clear movement to allow the beam to vibrate without action from the elevated weights.

What I claim as new, and desire to secure by Letters Patent, is—

1. The combination, with a scale-beam, of a continuous series of poises arranged side by side in line with said beam, movable supports for holding said poises clear of the scale-beam, and means for actuating the supports to lower the poises separately into engagement with the scale-beam and to lift them from engagement therewith, substantially as described.

2. The combination, with a scale-beam and a continuous series of poises adapted to be connected therewith side by side, of separate supports for said poises, whereby they are held clear of the beam, and slides connected with said supports to raise and lower the poises and suspend any required number from the beam, substantially as described.

3. The combination, with a scale-beam and a continuous series of poises adapted to be suspended from said beam or lifted clear of the same, of a series of movable supports for lifting the poises, slides for actuating said movable supports, and means for recording the weight when the supports are withdrawn from beneath the poises, substantially as described.

4. The combination, with a scale-beam and a series of poises arranged side by side in line with the beam, of a series of movable supports for holding said poises clear of the beam or lowering them into engagement therewith, as required, indicating-slides for actuating said movable supports, type carried by said slides, a movable record-strip, and means for pressing said strip in contact with the type, substantially as described.

5. The scale-beam C, connections D, and poises E, in combination with the lifters F, links G, and slides H, substantially as and for the purpose specified.

6. The lifters F, connecting-rods G, and slides H, in combination with the scale-beam C, poises E, and the partitions J, for keeping the lifters out of contact one with another, substantially as specified.

7. The scale-beam C, poises E, movable supports F, and slides H, in combination with a record-strip, M, and mechanism for impressing thereon a record of the weight as made, substantially as described.

8. The scale-beam C, poises E, supports F, and slides H, carrying impression-type, in combination with cam-shaft K, impression-block L', and record-strip M, for keeping a record of the weights, substantially as described.

HENRY HARRISON.

Witnesses:
ALBERT H. ADAMS,
HARRY T. JONES.